United States Patent
Bochkovskiy et al.

(10) Patent No.: US 7,436,356 B2
(45) Date of Patent: Oct. 14, 2008

(54) METHOD OF CROSS-CORRELATION AND CONTINUOUS WAVE INTERFERENCE SUPPRESSION FOR GPS SIGNAL AND ASSOCIATED GPS RECEIVER

(75) Inventors: Andrey Bochkovskiy, St. Petersburg (RU); Mikhail Goloubev, St. Petersburg (RU); Sergey Pospelov, St. Petersburg (RU); Mikhail Vasilyev, St. Petersburg (RU); Valeri Tchistiakov, St. Petersburg (RU); Mikhail Kholostov, St. Petersburg (RU); Sergey Nozdrachev, St. Petersburg (RU); Nikolay Mikhaylov, St. Petersburg (RU); Bijan Jalali, Irvine, CA (US)

(73) Assignee: MStar Semiconductor, Inc., Hsin-Chu Hsien (TW)

( * ) Notice: Subject to any disclaimer, the term of this patent is extended or adjusted under 35 U.S.C. 154(b) by 103 days.

(21) Appl. No.: 11/277,363

(22) Filed: Mar. 24, 2006

(65) Prior Publication Data
US 2007/0024499 A1 Feb. 1, 2007

Related U.S. Application Data

(60) Provisional application No. 60/595,662, filed on Jul. 26, 2005.

(51) Int. Cl.
*G01S 1/00* (2006.01)
*G01S 13/58* (2006.01)
*G01S 1/08* (2006.01)
*H03D 1/00* (2006.01)

(52) U.S. Cl. .............. 342/357.12; 342/107; 342/115; 342/386; 375/343

(58) Field of Classification Search .............. 342/357.01–357.17
See application file for complete search history.

(56) References Cited

U.S. PATENT DOCUMENTS

| 4,785,463 | A | * | 11/1988 | Janc et al. | 375/147 |
| 5,657,022 | A | * | 8/1997 | Van Etten et al. | 342/104 |
| 6,236,354 | B1 | | 5/2001 | Krasner | |
| 2005/0168382 | A1 | * | 8/2005 | Awata | 342/357.02 |
| 2005/0225483 | A1 | * | 10/2005 | Abraham et al. | 342/357.15 |
| 2005/0238087 | A1 | * | 10/2005 | Yang et al. | 375/219 |

OTHER PUBLICATIONS

Phillip Ward. "GPS Satlellite Signal Characteristics", Understanding GPS: Principles and Applications, pp. 83-97, Chapter 4.

* cited by examiner

*Primary Examiner*—Thomas H. Tarcza
*Assistant Examiner*—Harry Liu
(74) *Attorney, Agent, or Firm*—Winston Hsu

(57) ABSTRACT

A method for processing weak indoor signals in presence of cross-correlation or continuous wave interference and associated GPS receiver are provided. The method comprises providing a two-dimensional delay-Doppler accumulated power pattern having a plurality of accumulated powers corresponding to frequency and time; for a predetermined frequency, determining an average value of accumulated powers of the two-dimensional delay-Doppler accumulated power pattern over a plurality of times; and subtracting the average value from the accumulated powers used in determining the average at the frequency over the plurality of times to generate a delay-Doppler accumulated power pattern with suppressed interference effect.

11 Claims, 10 Drawing Sheets

METHOD OF CROSS-CORRELATION AND CONTINUOUS WAVE INTERFERENCE SUPPRESSION FOR GPS SIGNAL AND ASSOCIATED GPS RECEIVER

CROSS REFERENCE TO RELATED APPLICATIONS

This application claims the benefit of U.S. Provisional Application No. 60/595,662, filed Jul. 26, 2005.

BACKGROUND OF THE INVENTION

1. Field of the Invention

This invention relates generally to a receiver digital processing method and associated Global Positioning System (GPS) receiver, and particularly, to a method for processing weak indoor signals in the presence of cross-correlation or continuous wave interference and associated GPS receiver.

2. Description of the Prior Art

A conventional existing GPS receiver contains an antenna and an analogous front-end (AFE) followed by a digital section having dedicated signal processing circuitry and a digital CPU with related program and data memory and external data interface controllers. The antenna together with the analogous front-end intercept, select (band-pass filter), amplify GPS signals, convert them to a convenient intermediate frequency (IF) normally ranging from DC to several tens of MHz. To perform frequency conversion, the AFE utilizes a reference frequency from a stable reference oscillator. The AFE typically outputs digitized samples of a combination of signals and accompanying noise at IF. The frequency of sampling the AFE output is selected according to the Nyquist criterion, and for the Clear/Acquisition (C/A) GPS signal component is, at least about 2 MHz. A number of bits in digital AFE samples varies from one to three or four bits.

A digital section of the GPS receiver contains several correlate channels that perform correlation processing of several GPS satellite signals in parallel. GPS signals employ phase shift keying modulation with pseudo-random noise codes, see, for example, "Understanding GPS: Principles and Applications. Edited by Elliott D. Kaplan. Artech House, Boston, London, 1996, pp. 83-97". Received signals are characterized by a priori uncertainty of signal parameters: its code phase due to unknown (or not ideally known) time of the signal coming to the receiver, and its carrier frequency due to unknown (or not ideally known) Doppler shift and the reference oscillator frequency drift. Signal search in a GPS receiver, i.e. resolution of the above-mentioned uncertainty, requires time. Many applications of GPS need receivers that are capable of acquiring signals rapidly in difficult signal environments. For example, this can be reception of weak GPS signals indoors and in urban canyons. A short time to acquire these weak signals is important both from a direct viewpoint of a user requirement to get the first position fix as soon as possible, and from the viewpoint of supply energy reduction as a result of a short time-to-first-fix (TTFF).

When receiving weak GPS signals, for example, in urban canyons, indoor or under trees, a common problem appears associated with the fact that the signals can arrive to the receiver having significantly different strength. The problem is known as cross-correlation interference from stronger signals to affect the processing of weak signals. GPS signaling (its civil C/A component) was designed to be safely processed only if signals from other satellites are not stronger than by about 23 dB, or even less, to have a margin. General measures to mitigate the effect of cross-correlation interference are known. For example, the U.S. Pat. No. 6,236,354 to Krasner describes three techniques to decrease the effect of cross-correlation.

The $1^{st}$ technique makes use of the evaluated parameters of a strong signal acquired by the receiver, reproduces its waveform, appropriately scales it, and subtracts it from the signal combination at the input before any signal processing to remove the interference component from the input signal. Potentially, this $1^{st}$ technique is the most effective among the described ones. But implementing this technique as it is described in the U.S. Pat. No. 6,236,354 to Krasner has several disadvantages. First, the compensation of a strong signal can not be full, as there are two contradicting tasks: to suppress the strong signal that interferes with the reception of weak signals, and, simultaneously, to proceed tracking for the strong signal to use it in a navigation solution and continue fine tuning to suppress it. Second, in trying to deeply suppress the strong signal, it is easy to overcompensate it so that the replica becomes stronger than the original signal. There is a serious risk that continued tracking follows the subtracted replica, not the signal. The technique is not robust enough and needs improvement.

The $2^{nd}$ and the $3^{rd}$ techniques of mitigating cross-correlation according to the U.S. Pat. No. 6,236,354 to Krasner make use of the evaluated parameters of a strong signal acquired by the receiver, predict the cross-correlating effect from the strong signal to the anticipated weak signal, and correct the correlations accumulated for this weak signal. The difference between the techniques is that the $2^{nd}$ one comprises subtracting the predicted effect from the accumulations, and the $3^{rd}$ one simply discards potentially injured accumulations. A disadvantage of the $2^{nd}$ and the $3^{rd}$ techniques is their high computational requirements to predict the cross-correlation for all possible combinations of signals' PRN codes, code phase differences, and Doppler frequency differences. Possible simplifications reduce the effectiveness of the techniques. Another disadvantage of the $3^{rd}$ technique is that discarded accumulations may contain the desired signal correlations, and the probability of this occasion rises with the strength of the interfering signal or, equally, with a decrease of the weak signal power. The above-mentioned disadvantages of the $1^{st}$ technique proscribe effectively combining the techniques, for example, the $1^{st}$ and the $3^{rd}$ ones, and thus do not allow relaxing requirements of the $3^{rd}$ technique.

A common disadvantage of all listed-above cross-correlation interference suppression techniques is the complexity of involved hardware used to compensate for the interfering waveforms at the receiver input, and of the calculations required to accurately predict the parameters of interfering signals. New, simple and robust methods of cross-correlation interference suppression are demanded to meet the continuous growth in requirements of GPS receivers.

SUMMARY OF THE INVENTION

An objective of the present invention is to provide a simple method of suppressing interference to reception of weak GPS signals from strong cross-correlating GPS signals and from in-band continuous wave spurious emissions for a GPS receiver and a related receiver.

A method according to the present invention comprises providing a two-dimensional delay-Doppler accumulated power pattern comprising a plurality of accumulated powers associated with frequency and time (or code); for a predetermined frequency, determining an average value of accumulated powers of the two-dimensional delay-Doppler accumulated power pattern over a plurality of times; and subtracting the average value from the accumulated powers used in determining the average at the frequency over the plurality of times to generate a delay-Doppler accumulated power pattern with suppressed interference effect.

A receiver according to the present invention comprises an antenna; a radio-frequency front-end coupled to the antenna; digital signal processing circuitry coupled to the radio-frequency front-end, the digital signal processing circuitry adapted to output a two-dimensional delay-Doppler accumulated power pattern comprising a plurality of accumulated powers corresponding to frequency and time; and a processor coupled to the digital signal processing circuitry; the processor programmed to determine, for a predetermined frequency, an average value of accumulated powers of the two-dimensional delay-Doppler accumulated power pattern over a plurality of times; the processor further programmed to subtract the average value from the accumulated powers used in determining the average at the frequency over the plurality of times to generate a delay-Doppler accumulated power pattern with suppressed interference effect.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

This invention is illustrated by means of accompanying drawings. However, these figures represent examples of the invention and do not serve to limit its applicability.

DETAILED DESCRIPTION

This invention relates generally to navigation systems and more specifically to receiver digital processing methods, especially, for weak indoor signals in presence of cross-correlation or continuous wave interference, in satellite navigation systems such as the U.S. Global Positioning System (GPS), the Russian Global Navigation Satellite System (GLONASS) and the European Galileo system. For the sake of simplicity, reference will be made below only to the GPS system. The invention is directly applicable to other satellite navigation systems such as GLONASS and Galileo.

First, a full-featured GPS receiver is described. Second, a method according to one embodiment of the present invention is detailed with reference to the full-featured receiver. Lastly, a basic receiver also capable of performing the method is disclosed.

Figure 1:
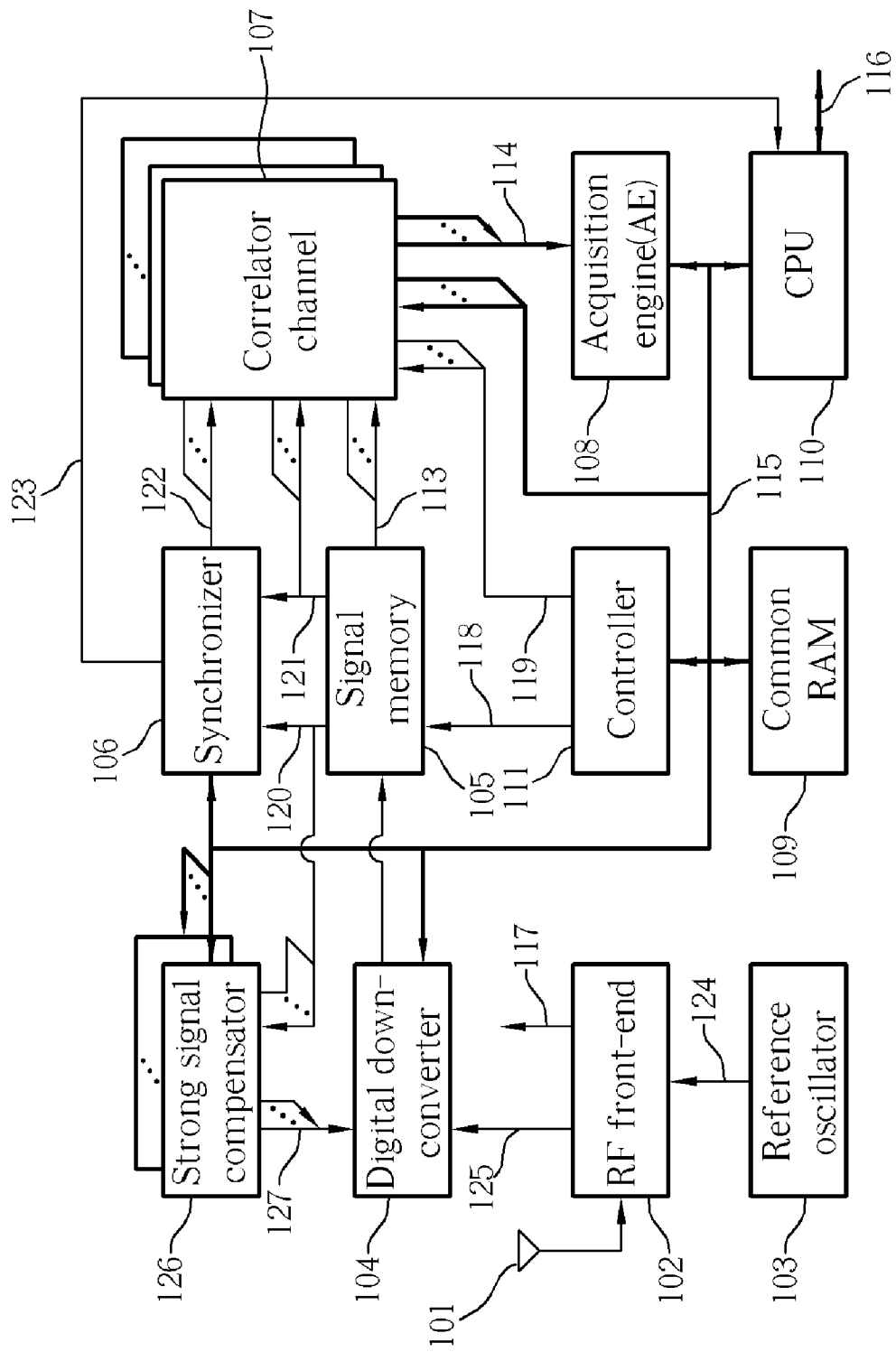
FIG. 1 is a block diagram of a GPS receiver according to one embodiment of the present invention.

FIG. 1 illustrates a GPS receiver according to one embodiment of the present invention that comprises an antenna 101, a radio frequency (RF) front-end (FE) 102 with a connected reference oscillator 103, a digital down-converter 104, a group of strong signal compensators (SSC) 126, a signal memory 105, a synchronizer 106, a group of connected in parallel correlate channels 107, an acquisition engine (AE) 108, a common random access memory (RAM) 109, a CPU 110 with a memory and a user interface 116, and a controller 111. The CPU 110 is coupled with the digital down-converter 104, with the correlate channels 107, with the common RAM 109, and with the controller 111 by a common data bus 115.

The RF FE 102 of GPS receiver typically comprises amplifier elements, including a low-noise input amplifier; band-pass filters for preliminary frequency selection of signals from noise and interference; one or more stages of signals frequency down-conversion; a frequency synthesizer for deriving local oscillator frequency from the reference oscillator 103 frequency, the same synthesizer typically also generating a digital clock 117 (main clock) to run all the digital processing throughout the receiver; and an output analog-to-digital converter of the signal at intermediate frequency, for example, with a number of conversion bits from 1 to 3, and with a single (real) or a complex pair of outputs 124.

In this embodiment, the RF FE 102 utilizes a single stage of frequency conversion. The reference oscillator 103 is a crystal oscillator with a relative instability of 2-30 parts per million.

Figure 4:
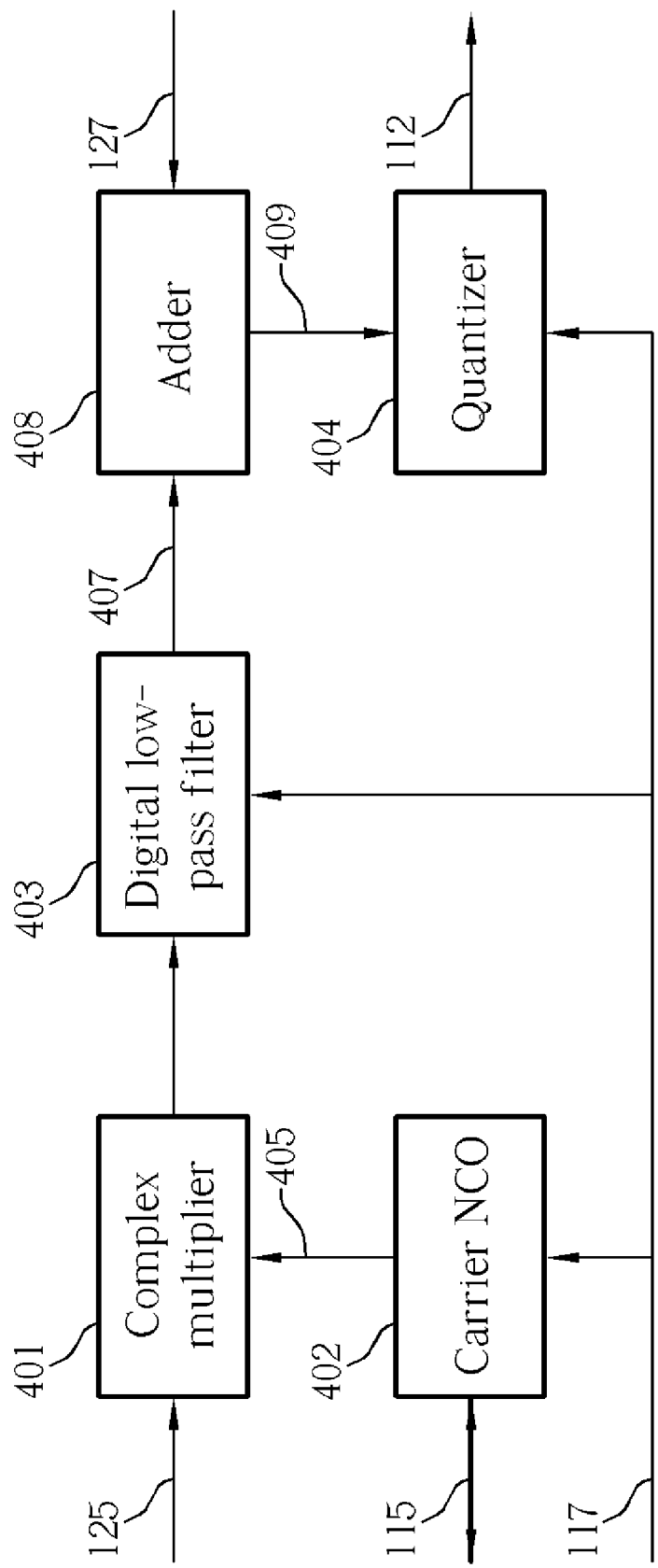
FIG. 4 is a block diagram of the digital down converter of FIG. 1.

FIG. 4 shows the digital down-converter (DDC) 104 comprising a complex multiplier 401, a carrier numerically-controlled oscillator (NCO) 402, a digital low-pass filter 403, an adder 408, and a quantize 404. An input 125 of the complex multiplier 401 represents the signal input 125 of the DDC 104. An output 112 of the quantize 404 represents the signal output 112 of the DDC 104. Inputs of the carrier NCO 402 and of the digital low-pass filter 403 are coupled to the clock output 117 of the RF FE 102. The complex multiplier 401 together with the carrier NCO 402 convert digital samples of the combination of GPS signals and noise from the IF to baseband. The digital low-pass filter 403 filters away aliases. The adder 408 is intended to subtract, from the filtered multi-bit combination of signals and noise, strong signal replicas generated by the strong signal compensators 126. The quantize 404 determines the number of bits in the signal output 112 of the DDC 104 to be further stored in the signal memory 105.

The carrier NCO 402 produces complex samples 405 of a frequency close to the IF commanded via the digital data bus 115. The carrier NCO 402 operates at the clock rate of the output signal 117 of the RF FE 102 output signal 117. For example, the complex multiplier 401 can be implemented either based on digital multiplying and (algebraic) summing (number of bits defined by the RF FE 102 output 125), or as a look-up table of all possible combinations of input sample values. The digital low-pass filter (LPF) 403 is implemented as a quadrate pair of finite impulse response filters based on register delay lines with 64 taps each and a 9-bit representation of filter coefficients. The adder 408 can be implemented as a multi-bit arithmetic adder of several SSC 126 output waveforms 127 with the digital LPF 403 output 407. Implementation of the quantize 404 depends on the choice of the number of bits in the samples to be stored in the signal memory 105. For single bit samples, the quantize 404 degenerates to a circuit just passing to its output the sign bit of the digital LPF 403 output signal 407. For a 2-bit output samples representation, an additional comparator is included in the quantize 404. A simple digital filter based on an accumulator, for example, can derive the threshold for the comparator. Added or subtracted accumulation constants define the desired relationship of output samples 407 that exceed, or not exceed, the threshold. For example, the relationship 30% to 70% for exceed to not exceed samples is commonly regarded to be close to the optimum. Then, if the threshold is exceeded, the accumulator is diminished by 7, and, if it is not exceeded, the accumulator is increased by 3. The most significant bits of the accumulator comprise the threshold value. The number of bits in the accumulator and the clocking rate define the filter time constant of the quantize 404.

Figure 5:
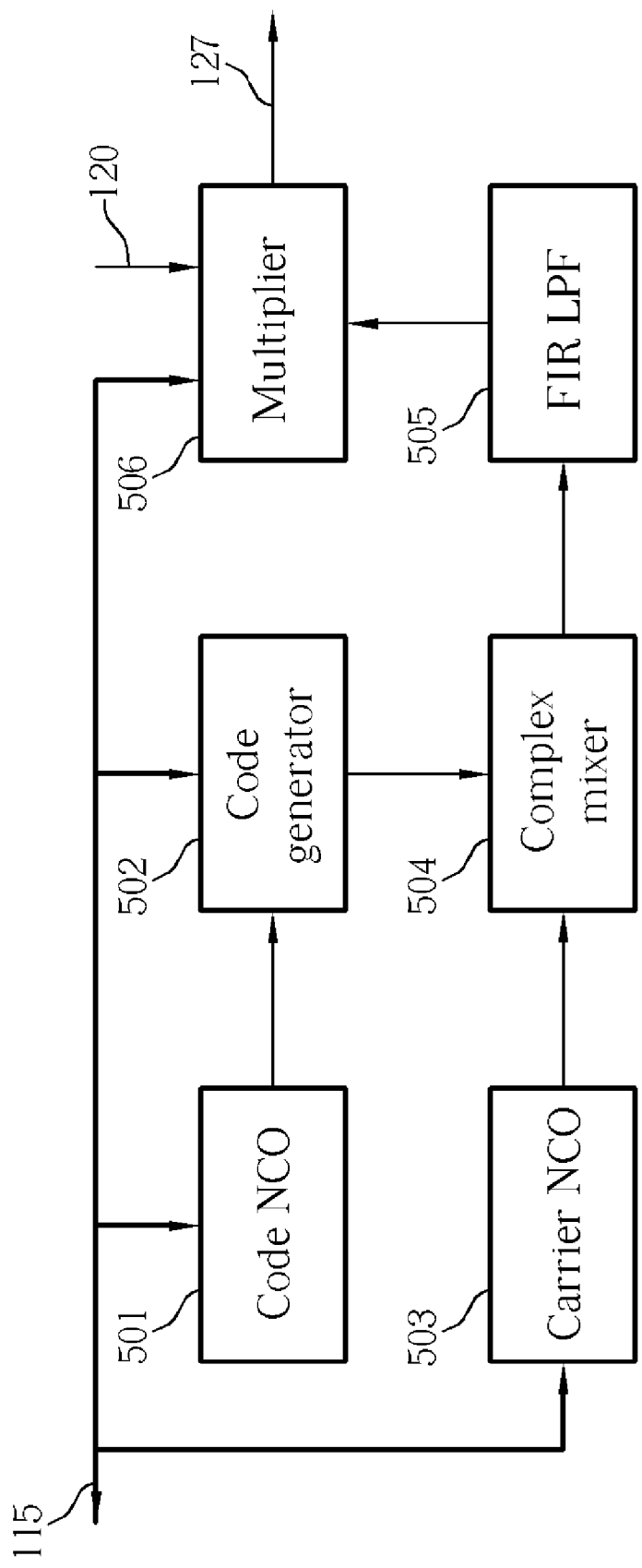
FIG. 5 is a block diagram of the strong signal compensator of FIG. 1.

FIG. 5 shows the strong signal compensator (SSC) 126 comprising a code NCO 501, a code generator 502, a carrier NCO 503, a complex mixer 504, an LPF 505, and a multiplier 506. The code NCO 501, the code generator 502, the carrier NCO 503, and the multiplier 506 are coupled to the common data bus 115 to apply controls, preferably from the CPU 110. Strong signal parameters estimated throughout the acquisition and/or tracking of the signal are used to apply appropriate controls. Code frequency and phase are used to control the code NCO 501 and the code generator 501; carrier frequency and phase are used to control the carrier NCO 503; a signal power estimate is used to calculate an appropriate scaling factor applied to the multiplier 506. Preferably, two different values of the scaling factor can be alternated in time with the portions of samples written into the signal memory 105. For this reason, a write pointer signal 120 is fed from the signal memory 105 to the multiplier 506 of the SSC 126.

Figure 3:
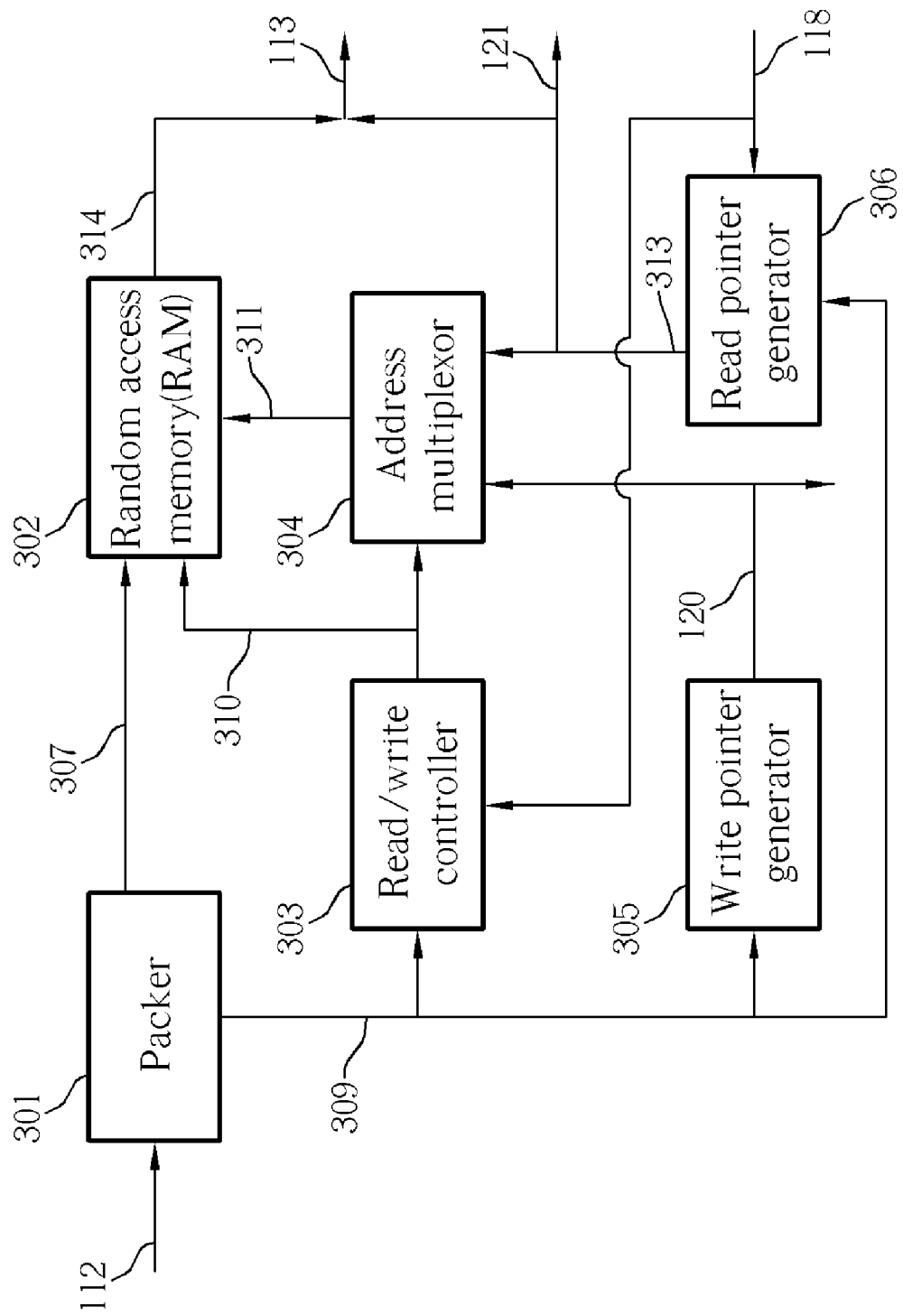
FIG. 3 is a block diagram of the signal memory of FIG. 1.

FIG. 3 shows the signal memory 105 comprising a packer 301, a random access memory (RAM) 302, a read/write controller 303, an address multiplexer 304, a write pointer generator 305, and a read pointer generator 306. The input of the packer 301 receives the signal memory 105 input 112. Data output 314 of the RAM 302 and the output 313 of the read pointer generator 306 couple to the signal memory 105 output 113. Complex samples of the signal 112 that comes from the DDC 104 at a sampling rate matched with its pass band are combined within the packer 301 into packs of several (N) samples, for example, four or eight complex samples. The random access memory (RAM) 302 can be a single ported one, for example, with a number of bits corresponding to the length of packs. For example, for a 2-bit quantizing of samples, and the length of packs equal to four, each pack (either 307 or 314) occupies 16 bits to store both in-phase and quadrate components. Regarding the read/write control, the signal memory 105 can be implemented as a cyclic buffer. Packs are written into the RAM 302 and are read from it by cyclically changing (to the same direction) addresses 311 provided by the address multiplexer 304 from the write pointer 312 or from the read pointer 313 depending on the current operation (write or read) 310 defined by the read/write controller 303. The write pointer generator 305 and the read pointer generator 306 can be implemented, for example, as counters. The state of the write pointer generator 305 is incremented with a validity signal 309 of another sample pack 307. The state of the read pointer generator 306 is incremented with every read clock, if the signal 118 enabling reads is valid. Let C denote the clock rate of the receiver digital part, S the sampling rate, and N the number of samples in a pack. Then, the number of read cycles throughout the whole RAM volume during one whole write cycle to this same RAM 302 can be expressed as C*N/S−1. For example, for the clock rate C=50 MHz, the sample rate S=2.048 MHz, and the number of samples in a pack N=4, during one complete write cycle to the RAM 302, approximately 96.6 complete read cycles from the RAM 302 are executed.

The synchronizer 106 gets the write pointer 120 and read pointer 121 codes from the signal memory, and is controlled from the CPU 110 via the data bus 115. Preferably, the synchronizer 106, after a fixed number of write pointer 120 steps, latches the code of the write pointer 120, generates a measurement epoch signal 122 on every occurrence of the read pointer 121 equal to the latched value of the write pointer during a whole cycle of the write pointer 120 started and finished on its latched value, and generates an interrupt 123 for the CPU after the burst of the measurement epoch signal 122 pulses.

Figure 2:
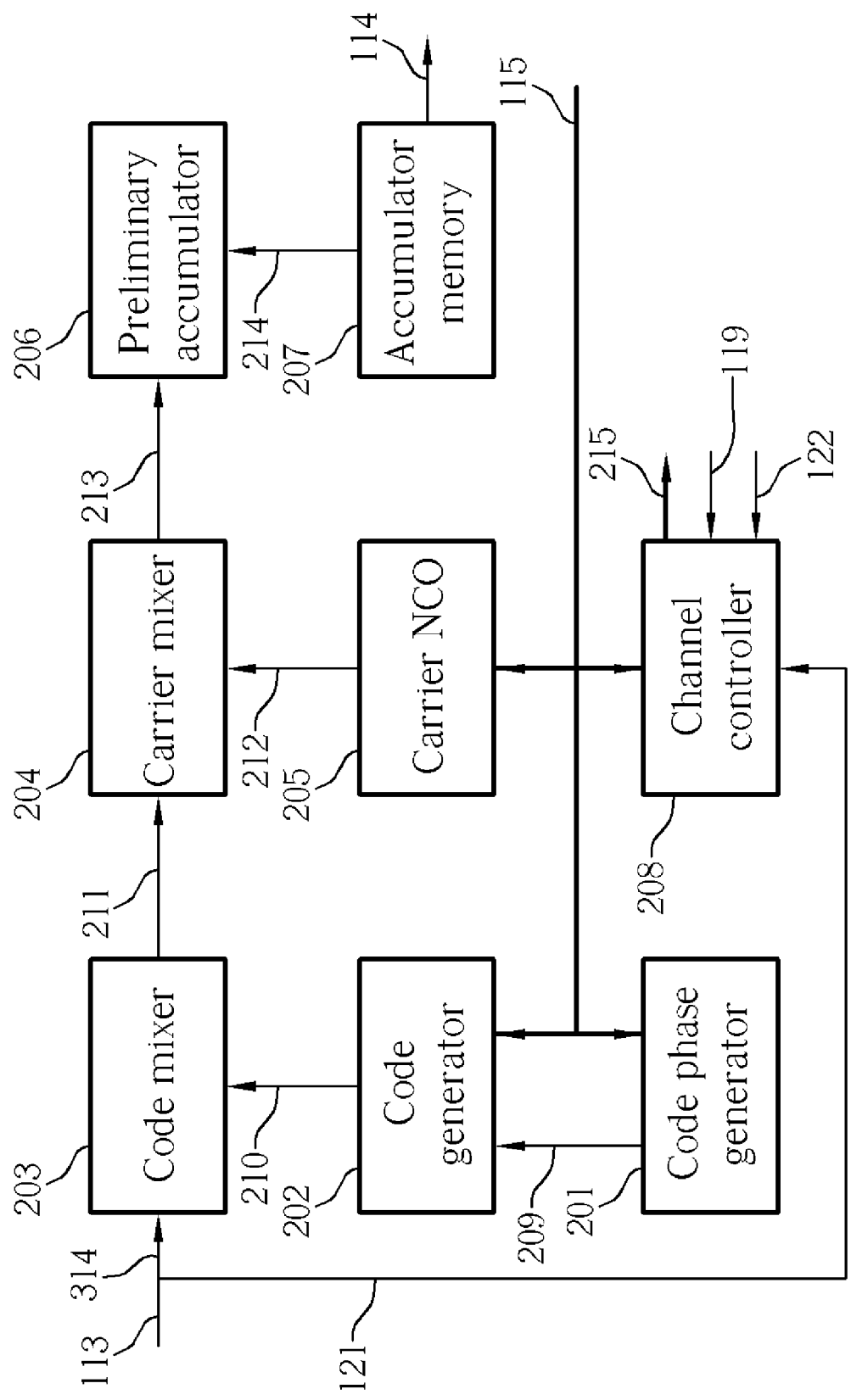
FIG. 2 is a block diagram of the correlate channel of FIG. 1.

Referring to FIG. 1 and FIG. 2, parallel correlate channels 107 can be identical. Their inputs are connected to the output 113 of the signal memory 105, and their outputs are combined in a data bus 114 that is coupled to the acquisition engine 108. FIG. 2 shows the correlate channel 107 comprising a code phase generator 201, a code generator 202, a code mixer 203, a carrier mixer 204, a carrier NCO 205, a preliminary accumulator 206, accumulations memory 207, and a channel controller 208. The code generator 202, driven by the code phase generator 201, produces packs of the signal replica 210 that are multiplied in the code mixer 203 with the corresponding received sample packs 113. The results within the packs are summed (signal 211) and further multiplied (in the carrier mixer 204) by the replica carrier samples 212 produced in the carrier NCO 205. The above summing is possible, as despreading in the code mixer 203 significantly narrows signal spectrum (signal 211). After the carrier mixer 204, output signal samples 213 are averaged in the preliminary accumulator 206 throughout a time interval defined by the a priori uncertainty of signal frequency. Accumulations memory 207 stores a batch of consecutive results 214 from the preliminary accumulator 206 to be further processed in the acquisition engine 108. The length of the batch is coordinated with the number of points in the Fourier transform performed in the acquisition engine 108. The code phase generator 201 produces a signal 209 required to advance the code generator 202 by calculating the value of code phase advance throughout the interval corresponding to the length of sample packs 113 and 210. The code generator 202, on each clock, produces a pack 210 of the local signal replica comprising several single-bit code samples.

The code mixer 203 multiplies input pack 113 complex pairs of samples (1-3 bits) by corresponding single-bit samples of code replica 210 coming from the code generator 202, and adds arithmetically the products throughout the pack separately for in-phase and quadrate components. Various implementations of the code mixer 203 can be made by those skilled in the art, especially accounting for only a few bits representing the operands. Implementation of the carrier NCO 205 of the correlate channel 107 is similar to that of the carrier NCO 402 of the DDC 104. Preferably, the carrier NCO 205 further contains a register that holds the carrier phase value latched at a measurement epoch defined by the synchronizer 106 and enabled by the channel controller 208.

The carrier mixer 204 can be implemented either based on digital multiplying and (algebraic) summing (the number of bits is defined by the code mixer 203 output 211 and carrier replica samples 212), or as a look-up table of all possible combinations of input sample values. The number of bits at the output 213 of the carrier mixer 204 depends on that of the inputs 211 and 212. For example, for two bits at the input 113 of the channel correlate 107, four samples in a pack, and five bits of the local carrier replica representation, the number of bits of the result at the output 213 of the carrier correlate 204 is equal to eight.

The preliminary accumulator 206 separately accumulates the in-phase and quadrate components of complex output 213 of the carrier mixer 204 throughout a predefined interval of coherent accumulation. The interval can be determined by the CPU 110, and transferred to the channel controller 208 via the common digital data bus 115 either directly or through the controller 111. The channel controller 208 enables starting processing in the channel when the read pointer 313 from the signal memory 105 reaches the value coinciding with the predetermined one, and disables processing after a predetermined number of processing steps. The channel controller 208 enables also, allowed by the CPU control, applying measurement epoch signals 122 to the code phase generator 201 and the carrier NCO 205. Throughout processing, the channel controller 208 enables accumulation by the preliminary accumulator 206 over the predefined interval, commands transferring the accumulations 214 to the accumulations memory 207, and commands resetting the preliminary accumulator 206, after which the latter is ready for a new accumulation cycle. The above mentioned and all other necessary controls by the channel controller 208 are represented in FIG. 2 as a generalized signal line 215. In the preferred embodiment, the accumulation interval is equal to $\frac{1}{16}$ ms (i.e. $\frac{1}{16}$ of the C/A code epoch) that enables accumulation coherency of the received signals that fall into a band of ±8 kHz. In one attractive implementation of the invention, the accumulations memory 207 comprises two identical sections, one being filled with new accumulations 214, while another is available for reading from the acquisition engine 108. The volume of each section of the accumulations memory 207 is sufficient to store a number of accumulations that can be processed by the acquisition engine 108 in a single invocation. For example, the volume of each section of the accumulations memory 207 is equal to 32 complex results that corresponds, with the accumulation interval of $\frac{1}{16}$ ms, to a 2 ms long accumulations batch stored.

Figure 6:
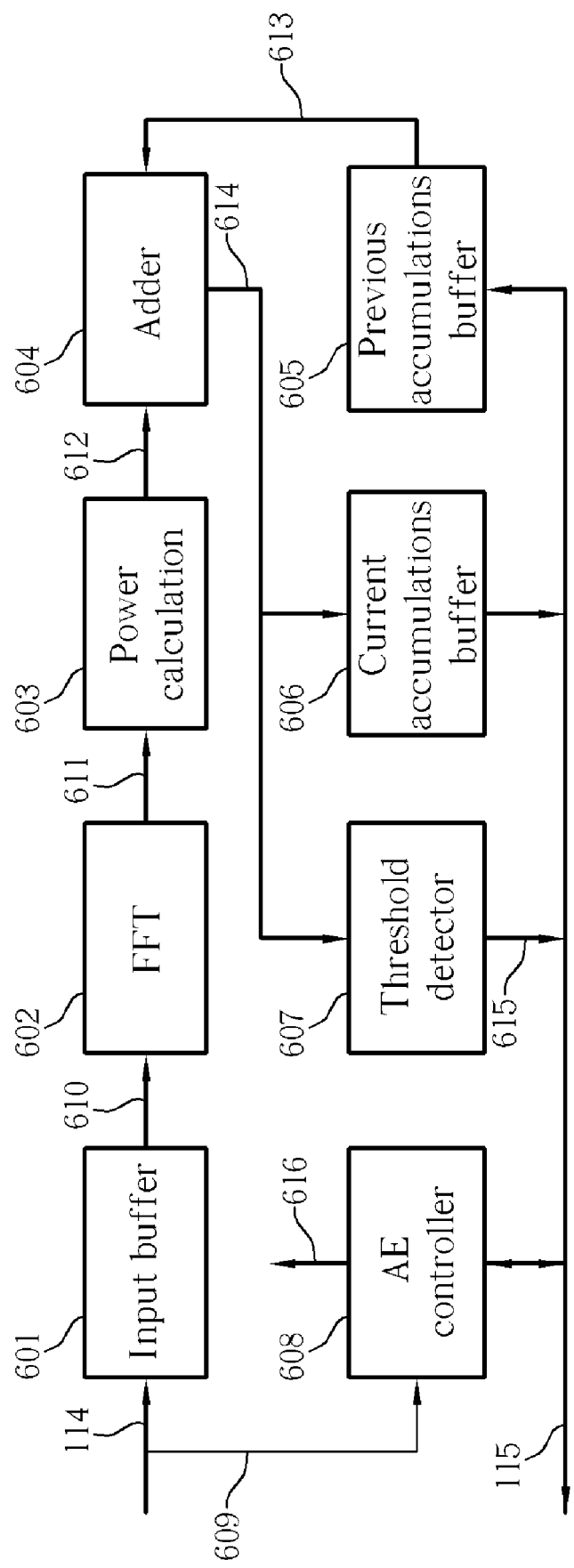
FIG. 6 is a block diagram of the acquisition engine of FIG. 1.

FIG. 6 shows the acquisition engine (AE) 108 comprises an input buffer 601, an FFT (Fast Fourier Transform) 602, a power calculator 603, an adder 604, a previous accumulation buffer 605, a current accumulation buffer 606, a threshold detector 607, and an AE controller 608. The acquisition engine 108, due to its high processing efficiency, sequentially serves the requests from all the correlate channels 107. After a correlate channel 107 has processed a predetermined batch of signal packs, the correlate channel 107 issues a request 609 to the acquisition engine 108, and the latter downloads preliminary accumulations 114 from the correlate channel 107 into the input buffer 601, applies the FFT 602 to the buffered data 610, converts the obtained amplitude spectrum 611 with the power calculator 603 into a power spectrum 612, adds these powers 612 to the previous accumulations 613 from the previous accumulation buffer 605, places the results 614 into the current accumulation buffer 606 and compares the results 614 against a predetermined threshold in the threshold detector 607. Simultaneously with the downloading of new previous accumulations from the common RAM 109 and new preliminary accumulations 114 from another correlate channel 107, the current accumulation buffer 606 is uploaded into the common RAM 109. When results exceed the threshold, the code and frequency search bin numbers are also downloaded to the common RAM 109. Preferably, the non-coherent accumulations stored in the common RAM 109 are further processed, including the comparison against a signal detection threshold, by software running in the CPU 110.

The FFT 602 transforms batches of 32 (zero-padded up to 64) complex (I and Q) 32-bit fixed-point preliminary accumulations 114 into 64 complex spectral components. High processing efficiency of the FFT 602 is gained due to a parallel processing, for example, implementing a radix-4 FFT. This means that in one clock cycle the FFT 602 processes 4 preliminary accumulations 114. The input buffer 601 can be implemented as a first-in-first-out (FIFO) buffer of depth 64, with a single 2×32-bit input of complex data 114 and four 2×32-bit outputs connected to four FIFO taps separated in depth by 16 words, thus forming a concatenated 2×128-bit data output 610. The power calculator 603 calculates the squares of complex components 611, four values per clock. Power calculator 603 can comprise four complex multipliers based on arithmetic multipliers and adders. The adder 604 comprises four arithmetic adders. The format of current and previous accumulations 613 and 614 summed in the adder 604 may differ from the format of storing them in the common RAM 109 and in the accumulation buffers 605 and 606. Preferably, the adder 604 operates with portions of four 32-bit fixed-point words, and the results are stored in the common RAM as pairs of 16-bit floating-point words. Converting formats can be performed by the accumulation buffers 605 and 606. The previous accumulation buffer 605 and the current accumulation buffer 606 can be implemented in different ways by those skilled in the art. The threshold detector 607 comprises a register of the threshold value, four sub tractors that compare four current accumulations 614 against the threshold, and a logic circuit that forms a record 615 with numbers of frequency bins where the accumulations exceed the threshold. A means to mask hitting the threshold at specific frequency bins is provided via the common data bus 115 to exclude accumulations potentially injured, for example, by cross-correlating interference. The AE controller 608 accepts the requests from the correlate channels 107 and generates sequences of control signals 616 enabling the described above interaction of the AE means.

The common RAM 109 comprises a standard single-ported random access memory of 8K 32-bit words. The CPU 110 can be selected from a wide range of 32-bit processors either with fixed or with floating-point, for example, TMS320C31, ADSP21060, ARM7TDMI or another, supplemented by a data interface means according to RS-232c, USB or another standard.

The controller 111 initializes the correlate channels 107 to perform a correlation processing task of a next batch of signal sample packs 113 by downloading new tuning data from the common RAM 109 to the correlate channels 107, and uploading current tunings to the common RAM 109 to reserve a possibility to revert to the suspended correlation processing task with a new batch of signal sample packs 113, and transfers, as an option, preliminary accumulations 114 from the channels 107 to the common RAM 109. The controller 111 operation is synchronized with the signal memory 105 filling with sample packs. Output control signals of the controller 111 are represented in FIG. 1 by the lines 118 and 119. It should be noted that various implementations of the controller 111 can be made by persons skilled in the art. One attractive implementation is based on the use of a digital microcontroller that performs all actions to control the channels 107 according to a program stored in the internal memory of the microcontroller.

The above-described full-featured GPS receiver is merely one example of a receiver that can perform the method according to the present invention, which is described hereinafter.

Figure 7:
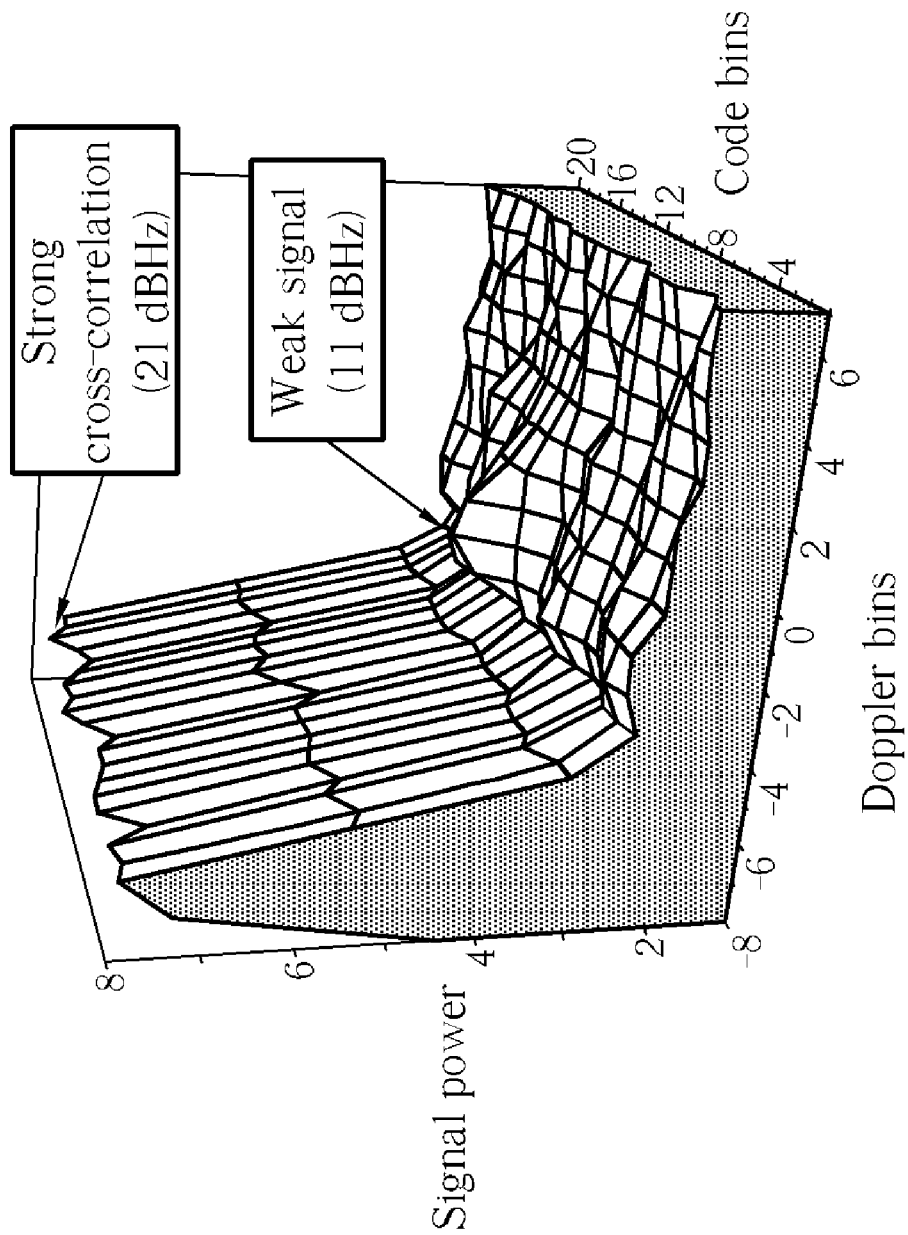
FIG. 7 is an example of a two-dimensional delay-Doppler search pattern affected by cross-correlating interference.

Due to the action of interference, either from strong cross-correlating GPS signals, or from continuous wave (CW) in-band interference, the two-dimensional delay-Doppler accumulated power pattern, formed in the common RAM 109 during the acquisition of weak indoor signals, is, typically, distorted. Acquiring of weak signals in the acquisition engine 108 is associated with accumulating of signal power over long time intervals, up to units and tens of seconds. During these long intervals, the effect of interference due to cross-correlating strong GPS signals, or due to CW interference is essentially smoothed, thus resulting, rather, in enlarged accumulated power values over Doppler bins of the two-dimensional delay-Doppler pattern. FIG. 7 illustrates a typical two-dimensional delay-Doppler accumulated power pattern. In FIG. 7 the axis "Doppler bins" can be regarded as frequency, the axis "Code bins" can be regarded as time, and the axis "Signal Power" is the power of the accumulated signals. The search pattern is exemplified as 16 Doppler bins by 20 code delay bins, although other sizes can also just as easily be used. An increased accumulated power "ridge" follows the frequency axis (the tall ridge labeled "Strong Cross-Correlation" at about Doppler bin −6 in FIG. 7). This ridge stems from the action of a strong cross-correlating GPS signal. In the example of FIG. 7, the interfering signal power accumulated during the weak signal search is about 10 dB (=21 dB-11 dB) higher than that of the weak signal correlation peak. The local power maximum associated with the weak GPS signal (the small "peak" labeled "Weak Signal" in the middle of FIG. 7) is essentially masked by the interference-induced ridge.

FIG. 7 shows an example of the interference of strong cross-correlating GPS signals (the tall ridge from, for example, a GPS satellite with a clear line of sight to the receiver) with the acquisition of weak signals (the small peak from, for example, a GPS satellite obstructed by a building or geographic feature). A prior art GPS receiver would very likely erroneously lock on to the strong cross-correlating GPS signals (the tall ridge) in its search for the weak signals (the small peak). It should be noted that the effects of interference, either from strong cross-correlating GPS signals or by CW in-band interference, can take other forms as well. For example, the tall ridge pattern can exist at any Doppler bin. Other patterns are also possible. The present invention aims to discount the effect of this ridge regardless of its specific form or location.

Figure 9:
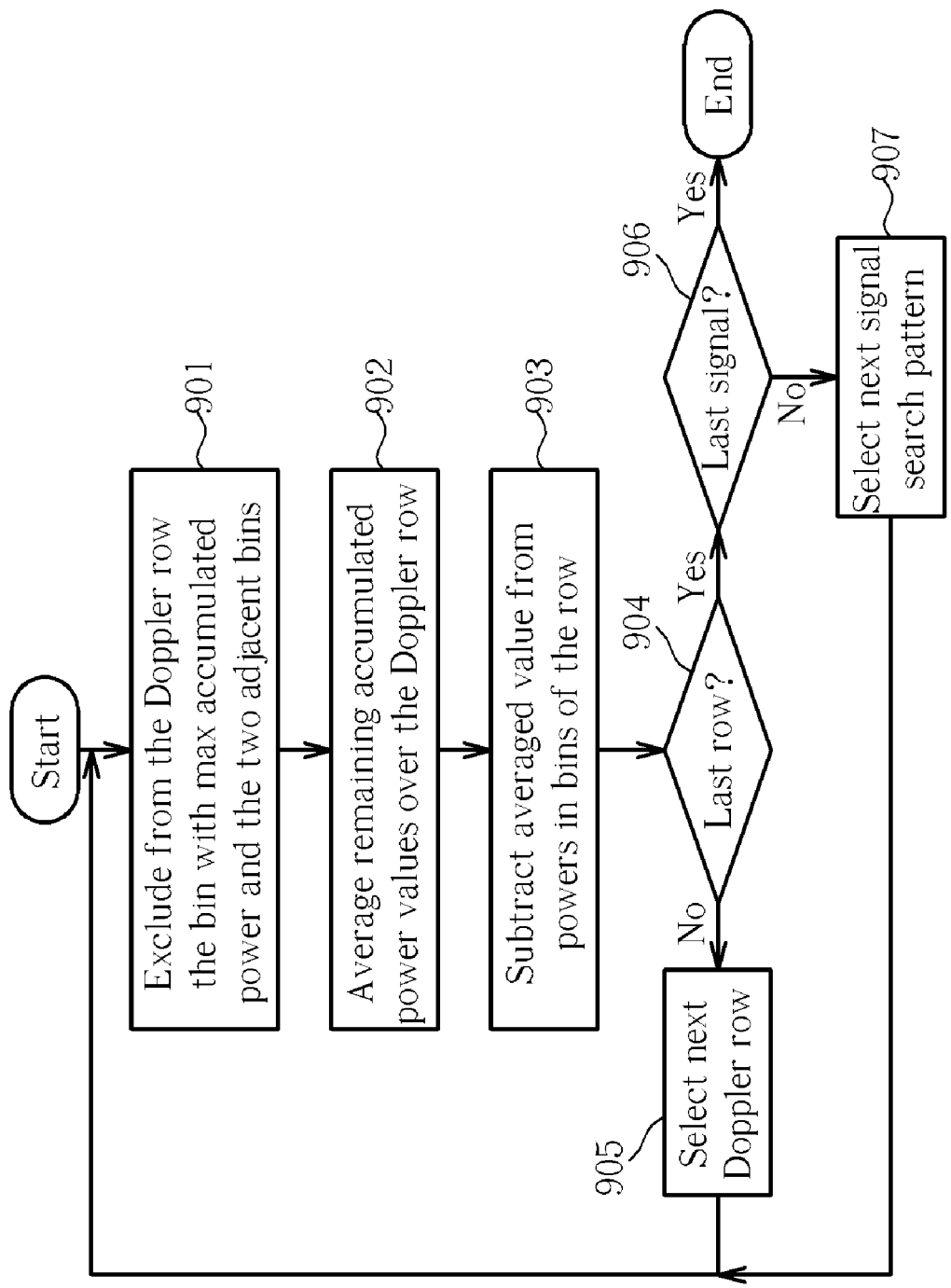
FIG. 9 is the flow-chart of the interference suppression method according to one embodiment of the present invention.

According to a preferred embodiment of the present invention, FIG. 9 illustrates a method capable of suppressing the influence of interference on the two-dimensional delay-Doppler accumulated power pattern is achieved through the steps illustrated by the flow chart in FIG. 9. In step 901, the code bin with the maximum accumulated power value and two adjacent bins are, temporarily, excluded from the selected Doppler bin of bins. In step 902, power values in the remaining bins are averaged. In step 903, the averaged value is subtracted from the powers in all bins of the row (frequency or Doppler bin). If this is not the last row of the pattern, then a new Doppler bin is selected in step 905, and steps 901 through 904 are repeated. Then, if not all signals to be acquired are processed, the pattern of a new signal is selected in step 907, and all steps 901 through 906 are repeated until the processing is done for all Doppler bins of all signal search patterns.

The method according to the present invention calculates the average power for a current Doppler bin value (e.g. the power values at Doppler bin=−6 along the code bins 0-20 range from about 7 to about 8), subtracts this average power (e.g. 7.5) from the original powers of the code bin row along the current Doppler bin value, and generates a compensated or normalized set of powers (e.g. these would range from 7 to 8 minus 7.5, that is from −0.5 to 0.5) for the current Doppler bin value. This process is repeated for as many Doppler bin values as necessary, and for as many signal patterns as desired.

According to the present invention, the averaging process can be a simple arithmetic mean, a median, a mode, a look-up table, etc. Any suitable averaging technique can be used. The steps of the present invention method can be performed in an order different than described, provided that the same basic result is achieved. Other steps not mentioned can also be intervening. In addition, not all Doppler bins or code bins need to be processed, a sampling procedure (e.g. using a subset of power values to calculate the average) can be used to increase speed. Lastly, with reference to the GPS receiver of FIG. 1-FIG. 6, method of the present invention, that is, the steps 901-907 of FIG. 9, can be performed by the CPU 110.

Figure 8:
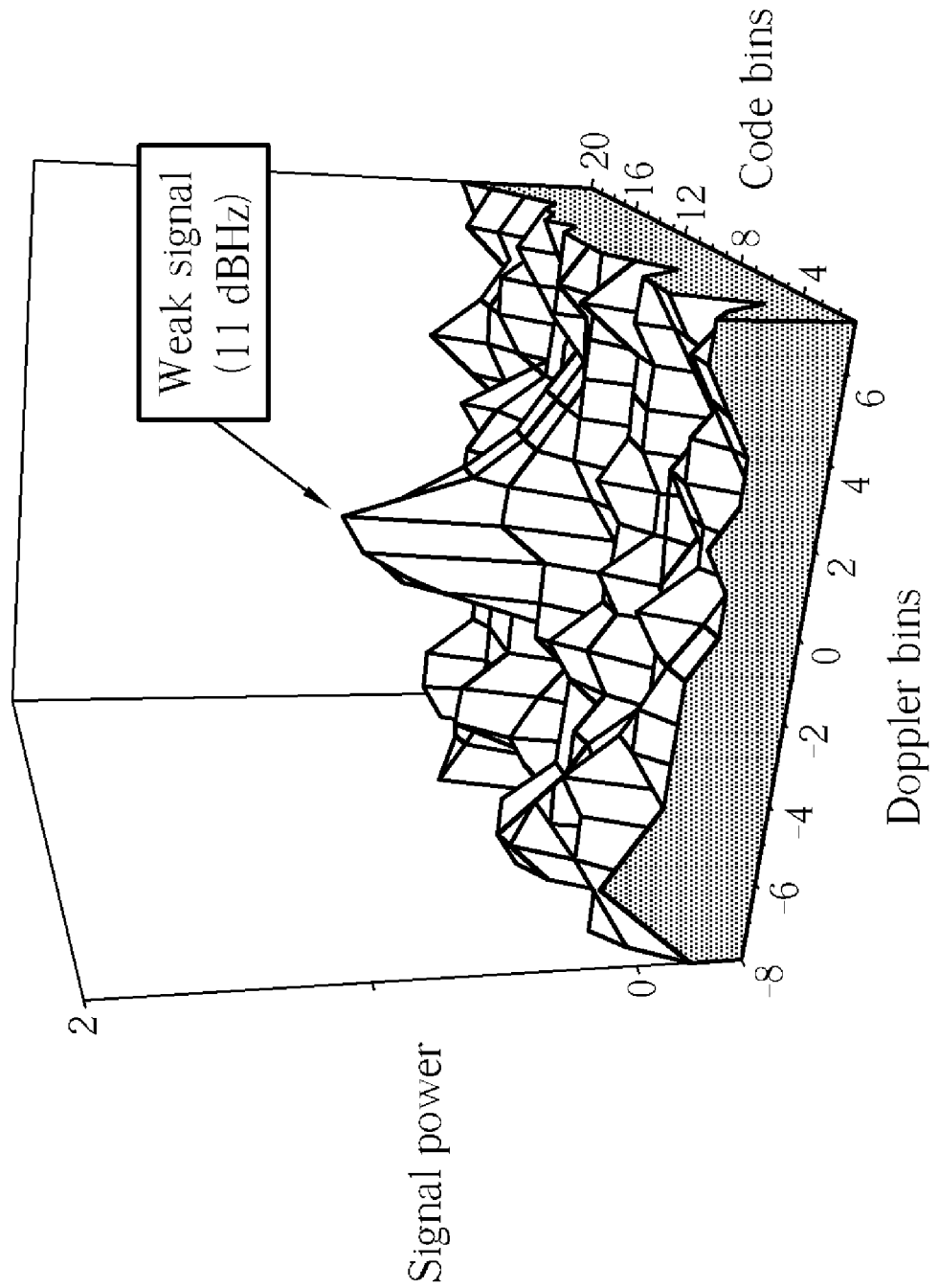
FIG. 8 is an example of a two-dimensional delay-Doppler search pattern after applying the interference suppression method according to one embodiment of the present invention.

The result of applying the method of interference suppression according to the preferred embodiment is illustrated by FIG. 8. The weak signal correlation peak (11 dBHz), which was totally hidden in FIG. 7, can be effectively detected after processing by the method. The graphs of FIG. 7 and FIG. 8 are taken from a real experiment, and reflect practical effectiveness of the method according to the present invention. Another effect from applying the method of present invention is that the averaged power values calculated through the method represent the noise level and are useful for accurately selecting the detection threshold to acquire weak signals.

Figure 10:
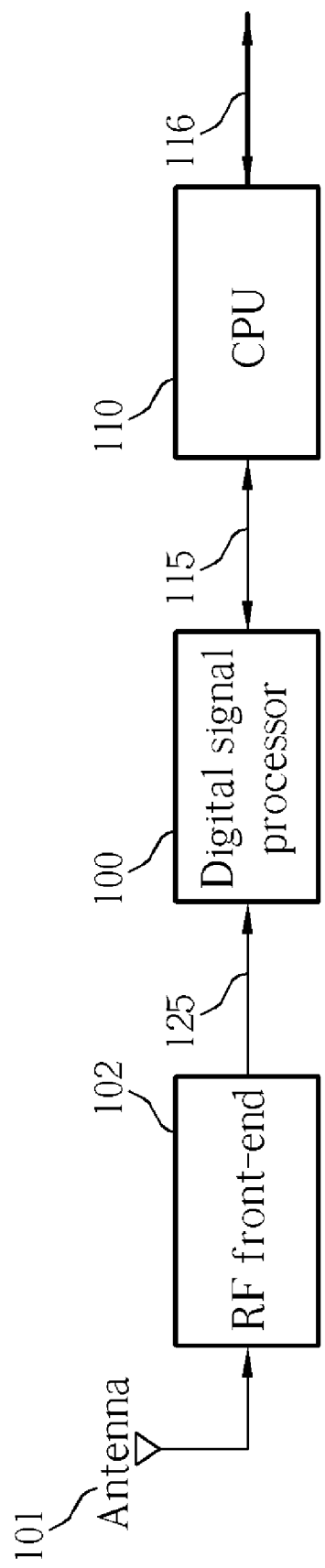
FIG. 10 is a block diagram of another GPS receiver according to the present invention.

Please refer to FIG. 10, which illustrates a basic receiver capable of performing the method of the present invention. The RF FE 102 is coupled to a digital signal processing circuitry 100 by a signal connection 125. The digital signal processing circuitry 100 is coupled via the data bus 115 to the already described CPU 110, which is connected to the user interface 116. The antenna 101, RF FE 102, and CPU 110 perform the operations disclosed above with reference to the full-featured receiver of FIG. 1-FIG. 6. The digital signal processing circuitry 100 performs well-known GPS signaling duties in addition to generating the accumulated power data of the chart of FIG. 7. The CPU 1 10, with reference to the accumulated power data provided by the digital signal processing circuitry 100, performs the method of the present invention, that is, the steps 901-907 of FIG. 9.

While the particular embodiment of the present invention discloses interference suppression for GPS signals, it can also be applicable to other spread spectrum signals, for example, used in communication systems. While only certain preferred features of the invention have been illustrated and described, various alterations and modifications will no doubt become apparent to those skilled in the GPS art after having read the above disclosure. Accordingly, it is intended that the appended claims be interpreted as covering all alterations and modifications that fall within the true spirit and scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a global positioning system (GPS) receiver to suppress an to suppress an interference effect on a two-dimensional delay-Doppler accumulated power pattern, the method comprising:

providing a two-dimensional delay-Doppler accumulated power pattern comprising a plurality of accumulated powers corresponding to frequency and time;

for a predetermined frequency, determining an average value of accumulated powers of the two-dimensional delay-Doppler accumulated power pattern over a plurality of time points by excluding accumulated power value at a maximum time point and two time points adjacent to the maximum; and subtracting the average value from the accumulated powers to generate a delay-Doppler accumulated power pattern with suppressed interference effect.

2. The method of claim 1 further comprising repeating the determining and subtracting steps for a plurality of frequencies to generate a two-dimensional delay-Doppler accumulated power pattern with suppressed interference effect.

3. The method of claim 1, wherein the average value is obtained by calculating an arithmetic means, a medium, or a mode.

4. The method of claim 1, wherein the average value is obtained by referencing a lookup table.

5. The method of claim 1, wherein the predetermined frequency is a Doppler bin of the two-dimensional delay-Doppler accumulated power pattern and each time point is associated with a code bin of the two-dimensional delay-Doppler accumulated power pattern.

6. A global positioning system (GPS) receiver comprising:

an antenna;

a radio-frequency front-end coupled to the antenna;

digital signal processing circuitry coupled to the radio-frequency front-end, to output a two-dimensional delay-Doppler accumulated power pattern comprising a plurality of accumulated powers corresponding to frequency and time; and a processor coupled to the digital signal processing circuitry to determine, for a predetermined frequency, an average value of accumulated powers of the two-dimensional delay-Doppler accumulated power pattern over a plurality of time points by excluding accumulated power values at a maximum time point and two time points adjacent to the maximum;

wherein the processor generates a delay-Doppler accumulated power pattern with suppressed interference effect by subtracting the average value from the accumulated powers.

7. The receiver of claim 6, wherein the processor is further programmed to repeat determining and subtracting for a plurality of frequencies thereby generating a two-dimensional delay-Doppler accumulated power pattern with suppressed interference effect.

8. The receiver of claim 6, wherein the average value is an arithmetic mean, a median, or a mode.

9. The receiver of claim 6, wherein the average value is obtained by referencing a lookup table.

10. The receiver of claim 6, wherein a frequency is a Doppler bin of the two-dimensional delay-Doppler accumulated power pattern and a time point is a code bin of the two-dimensional delay-Doppler accumulated power pattern.

11. The receiver of claim 6, wherein the processor is a 32 bit processor.

* * * * *